3,049,567
Patented Aug. 14, 1962

3,049,567
PURIFICATION OF DODECYL MERCAPTAN
Joseph F. Frantz, El Dorado, Ark., assignor to Monsanto Chemical Company, St. Louis, Mo., a corporation of Delaware
No Drawing. Filed June 3, 1959, Ser. No. 817,717
3 Claims. (Cl. 260—609)

This invention relates to the preparation of dodecyl mercaptans and more particularly to the purification of crude dodecyl mercaptans.

Dodecyl mercaptans are extremely useful articles of commerce. They are used in the preparation of synthetic rubber elastomers and in the preparation of detergents. Dodecyl mercaptans can be prepared by the catalytic reaction of $C_{12}$ acyclic olefins and $H_2S$. While various catalysts can be employed in this reaction, boron trifluoride has been found to be particularly effective. The boron trifluoride can be used per se as the catalyst or it can be employed in a catalyst system such as the boron trifluoride-water catalyst system. It has been found that while a catalyst comprised of boron trifluoride produces a significantly high yield of crude dodecyl mercaptan in the reaction of a $C_{12}$ acyclic olefin and $H_2S$, the crude material obtained is somewhat difficult to purify by conventional fractionation techniques and that special measures must be employed in order to obtain a satisfactory yield of the pure product. It is an object of this invention to provide an improved process for the purification of crude dodecyl mercaptan obtained by the reaction of a $C_{12}$ acyclic olefin and $H_2S$ in the presence of a catalyst comprising boron trifluoride. Additional objects will become apparent from the description of this invention.

It has been found that crude dodecyl mercaptan containing trace quantities of boron trifluoride will exhibit a significant degree of decomposition if subjected to temperatures in excess of 210° C. It has also been found that crude dodecyl mercaptan prepared in the presence of a catalyst comprising boron trifluoride will exhibit a significant degree of decomposition is subjected to elevated temperatures in the presence of nickel or metals containing 25% or more by weight of nickel. These discoveries have led to the novel purification process of this invention which comprises purifying crude dodecyl mercaptan prepared by the reaction of a $C_{12}$ acyclic olefin and $H_2S$ in the presence of a catalyst comprising boron trifluoride by substantially completely removing the boron trifluoride from the crude dodecyl mercaptan and then recovering substantially pure dodecyl mercaptan by subjecting the crude product to distillation under reduced pressure and at a temperature below 210° C. in a fractionating column wherein the surface of all areas of contact within the fractionating column and the crude dodecyl mercaptan is composed of a metal containing less than 25% by weight of nickel. The unusual behavior of crude dodecyl mercaptan prepared in the manner hereinbefore stated is illustrated by the following examples:

*Example I*

In this and the subsequent examples, crude dodecyl mercaptan was obtained by reacting approximately stoichiometric proportions of $H_2S$ and propylene tetramer at a temperature of approximately 60° C. in the presence of approximately 3 mol percent water and 3 mol percent $BF_3$ based on hydrogen sulfide fed to the reaction system.

A sample of the crude dodecyl mercaptan obtained as described above was washed once with approximately an equal volume of water. The crude dodecyl mercaptan thus obtained contained 71% dodecyl mercaptan and trace quantities of $BF_3$. The sample was subjected to a temperature of 210° C. in glass equipment, and at the end of 9 hours the material assayed only 52% dodecyl mercaptan.

*Example II*

Another sample of dodecyl mercaptan prepared as described in Example I was water washed four times with equal volumes of water. The material assayed 83% dodecyl mercaptan. This material was free of boron trifluoride. The material was subjected to a temperature of 210° C. in glass equipment and after seven hours did not exhibit any decrease in dodecyl mercaptan content.

*Example III*

Crude dodecyl mercaptan prepared as described in Example I was washed with four equal volumes of water to remove all of the boron trifluoride. Strips of aluminum were placed in this material and the material then heated. After 4½ hours at temperatures of 210° C. or below, no decrease in the dodecyl mercaptan content of the material was noted. After one hour at 238° C., the dodecyl mercaptan content had dropped from 96% to 89%.

Similar results were obtained when dodecyl mercaptan was heated in the presence of 316 stainless steel containing 10–14% nickel.

*Example IV*

Crude dodecyl mercaptan was prepared as described in Example I and then water washed with four equal volumes of water to completely remove the boron trifluoride catalyst. A nickel strip was immersed in a sample of the material and the material heated. After four hours at 210° C. the assay of the dodecyl mercaptan had decreased from 84% to 63%.

The process conditions employed to prepare the crude dodecyl mercaptans to be purified according to the novel process of this invention are not critical. It is only necessary that a catalyst comprising boron trifluoride be employed. The catalyst can be boron trifluoride per se or it can be a catalyst system in which boron trifluoride is one of the active agents. Thus, the boron trifluoride-water complex catalyst system can be employed as well as other catalyst systems using boron trifluoride.

In the practice of the process of this invention, boron trifluoride is removed from the crude dodecyl mercaptan by any technique well known to those skilled in the art. It has been found that boron trifluoride can be effectively and completely removed from crude dodecyl mercaptan by washing with water or by washing with a dilute alkaline solution, such as a 5% by weight sodium hydroxide solution. Four separate washings with equal volumes of water has been found to be effective in removing boron trifluoride from crude dodecyl mercaptan. The particular technique employed is not critical as long as the boron trifluoride is completely removed from the crude.

The fractional distillation of the crude dodecyl mercaptan can be carried out by any of the techniques well known to those skilled in the art. Packed columns, perforated tray columns and bubble cap tray columns are all equally suitable. It is necessary that all surfaces of contact, including packing and fittings, between the column and the crude dodecyl mercaptan being fractionally distilled be composed of a metal containing less than 25% by weight of nickel. It is not necessary that the entire column be constructed of this material, merely the surfaces of contact between the mercaptan and the column. Aluminum and stainless steels containing less than 25% by weight of nickel have been found to be particularly useful. In carrying out the fractionation, the column is operated under reduced pressure in order to maintain a temperature throughout below about 210° C. Any temperature below 210° C. is operable, there is no lower critical limit. Generally, unreacted $C_{12}$ acylic olefin and a small amount of dodecyl mercaptan is taken overhead in the operation of such a fractionating column and dodecyl mercaptan recovered from the lower portion of the column. The exact point of recovery of dodecyl mercaptan from the column will be dictated by the degree of purity desired.

What is claimed is:

1. A process for the purification of crude dodecyl mercaptan obtained by the reaction of a $C_{12}$ acylic olefin with $H_2S$ in the presence of a catalyst comprising boron trifluoride, which comprises washing the crude dodecyl mercaptan with water to completely remove the boron trifluoride therefrom, subjecting the boron trifluoride-free dodecyl mercaptan to purification by fractionating in a fractionating column wherein all surfaces of contact between the column and the dodecyl mercaptan are composed of a metal containing less than 25% by weight of nickel and wherein the column is operated under a reduced pressure so as to maintain a temperature throughout of below about 210° C., and recovering substantially pure dodecyl mercaptan.

2. A process as described in claim 1 wherein the surface contact between the fractionating column and the dodecyl mercaptan being purified in the fractionating column is composed of aluminum.

3. A process as described in claim 1 wherein the surface of contact between the fractionating column and the dodecyl mercaptan being purified in the fractionating column is composed of stainless steel containing less than 25% by weight of nickel.

References Cited in the file of this patent

UNITED STATES PATENTS

| | | |
|---|---|---|
| 2,426,648 | Schulze et al. | Sept. 2, 1947 |
| 2,468,739 | Eaton et al. | May 3, 1949 |